April 21, 1931.                J. B. LADD                 1,801,773
                                NUT LOCK
                          Filed Dec. 28, 1929
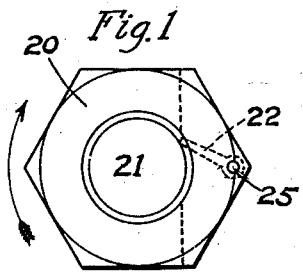
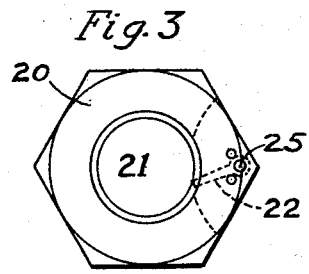
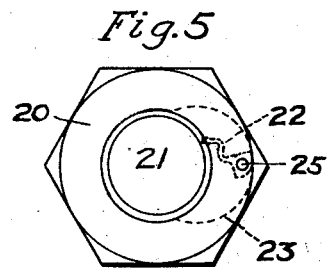
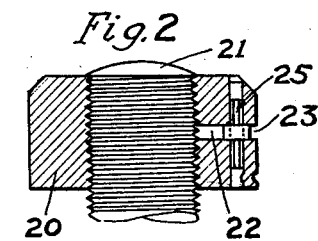
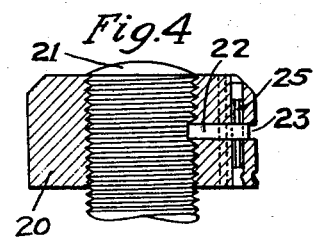
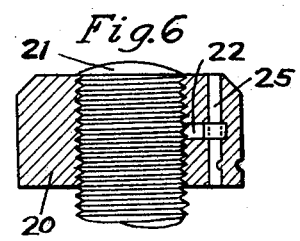
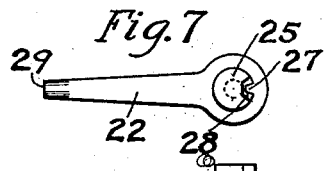
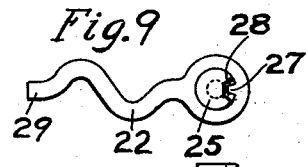
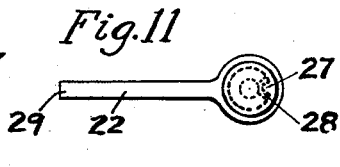
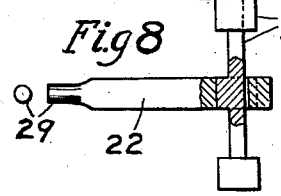
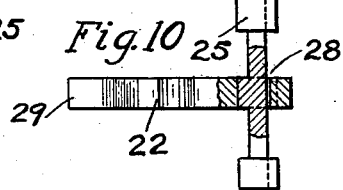
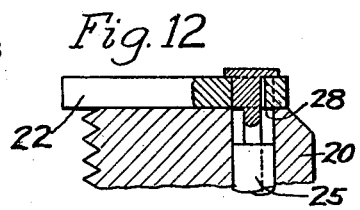
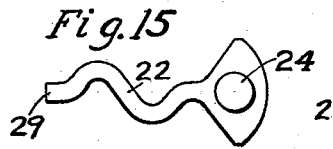
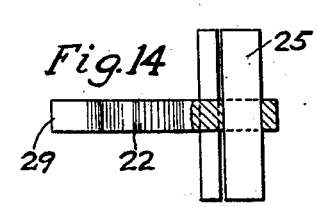
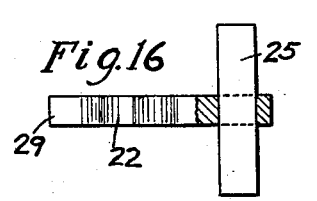
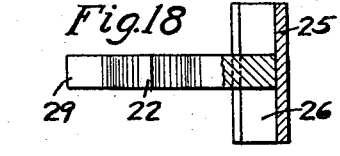
INVENTOR
James B. Ladd
BY
ATTORNEY Patented Apr. 21, 1931

1,801,773

UNITED STATES PATENT OFFICE

JAMES B. LADD, OF ARDMORE, PENNSYLVANIA

NUT LOCK

Application filed December 28, 1929. Serial No. 417,047.

This invention relates to means for locking cooperating threaded elements, such as a nut to a bolt for the purpose of holding the nut from working loose, and refers particularly to means for holding a nut against rotation in either direction up to a predetermined rotary torque.

In one form, the invention comprises an improved construction of the locking means so as to have same entirely within the nut with no part exposed to injury from contact with other nuts or the like, either before or after being put in service.

Other objects and advantages of the construction will be seen from the description following and the accompanying drawings, which illustrate, merely by way of example, suitable embodiments of the invention.

Fig. 1 is a plan view of a nut on a bolt with a locking pawl shown in dotted lines.

Fig. 2 is a part section, part elevation of the device shown in Fig. 1.

Fig. 3 is a plan view showing a modification.

Fig. 4 is a part section, part elevation of the structure shown in Fig. 3.

Fig. 5 is a plan view showing a further modification.

Fig. 6 is a part section, part elevation of the structure shown in Fig. 5.

Fig. 7 is a plan view on an enlarged scale of the locking pawl shown in Fig. 1, and the pin on which it turns.

Fig. 8 is an elevation of the structure shown in Fig. 7, partly in section.

Fig. 9 is a plan view on an enlarged scale of another form of locking pawl and the pin on which it turns.

Fig. 10 is an elevation of the structure shown in Fig. 9, partly in section.

Fig. 11 is a plan view on an enlarged scale of another form of locking pawl and the pin on which it turns.

Fig. 12 is an elevation of the structure shown in Fig. 11, partly in section.

Fig. 13 is a plan view on an enlarged scale of still another form of locking pawl.

Fig. 14 is an elevation of the structure shown in Fig. 13, partly in section.

Fig. 15 is a plan view on an enlarged scale of the locking pawl shown in Fig. 5.

Fig. 16 is an elevation of the structure shown in Fig. 15, partly in section.

Fig. 17 is a plan view on an enlarged scale of still another form of locking pawl and another form of pivoting means.

Fig. 18 is an elevation of the structure shown in Fig. 17, partly in section.

Similar numerals refer to similar parts throughout the several views.

Broadly described, my invention comprises a pawl movably connected with a pin secured in a nut, the pawl adapted to move angularly with respect to the axis of the nut and so located and confined that when the nut is turned onto the bolt its free end will be brought into forcible contact with the thread on the bolt and will resist the rotation of the nut in the reverse direction up to a predetermined torque, and will yield when the torque is increased above the predetermined amount and be moved angularly by the reverse rotation of the nut into a position in which it will resist the rotation of the nut in the opposite direction.

In general, when a nut 20 with my locking device is put on a bolt 21, with a right-hand thread, the pawl 22 will automatically be brought into the position in which it is shown in Fig. 1, by the rotation of the nut in the direction of the arrow shown, and if the nut is forcibly turned in the reverse direction the pawl will be moved around into the position in which it is shown in Fig. 3.

The pawl, in one of the preferred embodiments, is located in a slot such as 23, cut into the nut at right angles with the axis of the nut as shown in Figs. 1 and 2, or the slot may be of the form shown in Fig. 3, or cut from the inside of the nut as shown in Fig. 5, or otherwise. But the pawl may be located entirely without the nut as shown in Fig. 12, and this construction is preferred at times.

Generally the pawl is formed with an eye, such as 24, at one end, and a pin such as 25, passing through this eye, is used to locate and confine said end; but the end of the pawl may be cylindrical in form as at 26, and it may be confined by a tubular or channelled formation such as 25', as shown in Fig. 17. Accordingly when the term pin is used hereinafter it shall be understood to include a solid pin such as shown in Figs. 7 to 16 inclusive, or a hollow or a tubular pin such as shown in Figs. 17 or 18, or the equivalent.

In accordance with my invention, the pawl is always free to move around its pin, through a slight angle to and from either side of a line drawn through its pin and the center of the nut, but its free angular motion is positively limited by means such as shown in Fig. 7, where a tit or projection 27 on the inside of the eye on the pawl extends into a recess in the pin, or by other means of properly disposed stops such as shown in Figs. 3, 5, 11, 15 and 17.

When the pawl is at the limit of its free angular movement in either direction, its free end 29 extends into the threaded hole or bore of the nut, and when the nut is rotated onto the bolt, said free end is forced beyond said angular position and is brought into forcible contact with the thread on the bolt. This final movement, beyond its free angular movement, results in the flexure of the pawl when a pawl is used of the form shown in Figs. 9, 11, 13, 15 and 17; or, where the arrangement is such as shown in Figs. 7 and 8, where the free movement of the pawl is limited by a tit or projection within the eye of the pawl engaging with a slot in the pin, the pin is subject to torsion when the free angular motion of the pawl is exceeded. In this case the pin is shown reduced in cross section above and below the pawl to give the desired torsional resistance to the movement of the pawl, but such reduction in cross section may not be used. It is to be noted that in all cases one end of the pin is rigidly secured against rotation, as shown in Figs. 2, 4 and 6, or otherwise, while there is always a limited relative rotative movement between the pawl and its pin.

When the nut has been rotated on the bolt in the direction of the arrow, as in Fig. 1, and the pawl is forcibly in contact with the thread on the bolt, it is evident that if the nut is rotated in the reverse direction the pawl must pass a radial position in passing over to the position shown in Fig. 3, and therefore, to permit the pawl to be forced by the rotation of the nut from the position shown in Fig. 1 to the position shown in Fig. 3, it is essential that the pawl must be shortened lengthwise if the pin is rigid, or the pin must be moved radially away from the bolt if the pawl is rigid and does not yield to the compressive strain upon it.

When a rigid pin is used, a shortening of the pawl is obtained by using a pawl of resilient material in form such, for example, as shown in Figs. 9, 13, 15 and 17, which will yield to compressing strain in the direction of its length; and when a pawl rigid against compression (such as shown in Figs. 7 and 11) is used, a pin of resilient material adapted to yield to transverse strain is used, such as shown in Figs. 8 and 12.

Particular attention is called to the pawls shown in Figs. 9, 13, 15 and 17, as such pawls are of resilient material adapted to yield to compressive strain in direction of their length, and also to yield by flexure to the transverse strain to which they will be subjected when their free ends are forced past the extremes of the free angular motion permitted. It will also be noted that the combined resilience of the pawl and of its pin may be utilized as in Figs. 9 and 10.

The free end of the pawl which contacts with the thread on the bolt is preferably of a cylindrical form as shown in Figs. 7 and 8, but may be of any form adapted to holding the nut against rotation, either by friction or by biting into the thread, or both.

What I claim is:

1. A device for locking a nut to a bolt or the like comprising a pawl pivotally mounted on a pin seated in the nut with its axis approximately parallel with the bore of the nut, the pawl normally extending from said pin into the bore of the nut, one of said members being resilient to permit said pawl to be snapped to either side of a line connecting said pin and the center of said bore, and means limiting the free angular movement of the pawl to a small angle to either side of said line, said limiting means causing the free end of the pawl to forcibly engage the thread on the bolt when it is snapped by the rotation of the nut to either limit of its free angular motion.

2. A device for locking a nut to a bolt, comprising a pivoted pawl, and a pin therefor of resilient material mounted on the nut to yield by flexure when subjected to transverse strain by the pawl.

JAMES B. LADD.